United States Patent [19]
Hess et al.

[11] Patent Number: 5,788,394
[45] Date of Patent: Aug. 4, 1998

[54] GROOVED BALL AND SOCKET JOINT

[75] Inventors: Richard W. Hess, Ellicott City, Md.;
Craig E. Finch, Petersburg, Mich.

[73] Assignee: Bowles Fluidics Corporation,
Columbia, Md.

[21] Appl. No.: 839,152

[22] Filed: Apr. 23, 1997

[51] Int. Cl.⁶ .................................................. F16B 7/10
[52] U.S. Cl. .......................... 403/52; 403/122; 403/131;
403/112; 403/141; 454/155
[58] Field of Search ........................... 403/52, 112, 113,
403/114, 115, 116, 117, 127, 128, 141,
142, 91, 92, 93, 94, 95, 96, 131, 132

[56] References Cited

U.S. PATENT DOCUMENTS

| 438,238 | 10/1890 | Jefferies et al. | 403/131 |
|---|---|---|---|
| 788,035 | 4/1905 | Fergusson | 403/114 |
| 2,749,074 | 6/1956 | Bodian | 403/142 X |
| 4,111,570 | 9/1978 | Morel | 403/18 |
| 4,225,260 | 9/1980 | Gaines | 403/132 X |
| 4,662,772 | 5/1987 | Schultz | 403/114 |
| 4,701,990 | 10/1987 | Kehl et al. | 29/441 R |
| 4,947,704 | 8/1990 | Gokee | 403/141 X |
| 5,297,989 | 3/1994 | Stouffer et al. | 454/155 |
| 5,356,336 | 10/1994 | Stouffer et al. | 454/155 |
| 5,360,282 | 11/1994 | Negengast et al. | 403/122 X |
| 5,662,360 | 9/1997 | Guzowski | 285/110 |

*Primary Examiner*—Kenneth J. Dorner
*Assistant Examiner*—Bruce A. Lev
*Attorney, Agent, or Firm*—Jim Zegeer, Esq.

[57] ABSTRACT

A joint comprising a body member defining an annular groove and a pair of tangential notches intersecting the annular groove at diametrically opposed positions. A socket member is comprised of a preferably semispherically shaped frame having an open side and a pair of diametrically opposed knob or pin member. Each knob or pin member is engagable with one of the tangential notches to snap fit the body member within the semispherically shaped frame and within the annular groove. The body member is secured to a mounting bar and the semispherically shaped frame has an elongated slot and the mounting bar passes through the slot. The arrangement is such that the slot defines one path of rotation of the shaped frame member relative to the body member and the annular groove defines a second path of relative rotation between the body member and the shaped frame. Cooperating friction surfaces are formed on the frame and body members to control resistance to movement and maintain the members in their positions of adjustment.

5 Claims, 3 Drawing Sheets

GROOVED BALL AND SOCKET JOINT

The present invention relates to a ball and socket joint and more particularly to a grooved ball and socket joint and still more particularly to a ball and socket joint that is particularly useful in vehicle air outlets having a manual joy stick control member which has a wide angular movements in two degrees of movement.

BACKGROUND AND BRIEF DESCRIPTION OF THE INVENTION

Stouffer et al Pat. Nos. 5,297,989 and 5,356,336 (incorporated herein by reference) disclose air outlets in which directionality of air flow exiting the outlet is controlled by an upstream intruder member in conjunction with an outlet bell having downstream diverging sidewalls. The intruder member is mounted on or formed with a manually manipulated control shaft which is adjustably held in position by a ball and socket joint. Since these fluidic air conditioning outlets are for the instrument panel of an automobile, a mechanism is required that positions the intruder within the airstream flowing through the outlet and the mechanism must be easy to actuate but maintain a uniform "feel" with a full range of vertical and horizontal motion. The mechanism should be easy to fabricate and assemble and of low cost.

The present invention solves these problems by providing a grooved ball and socket joint which has two directions (x, y) of freedom of movement and consists of two basic members: (1) A body member which has a semispherically shaped surface and has an annular groove formed therein and a pair of tangential notches intersecting the annular groove at diametrically opposed positions; and (2) A socket member which is comprised of a shaped frame having an open side and a pair of diametrically opposed knob members, each knob member being engagable with one of the tangential notches to snap fit the body member within the semispherically shaped frame and within the annular groove. The body has a spherical surface which is engaged by band member on the semispherically shaped frame to provide substantially constant friction pressure on the "ball" portion of the body member.

The body member is secured to a mounting bar which is, in turn, secured within the unit in which the ball and socket mechanism is to be operated. In a preferred embodiment, the semispherical shaped frame has an elongated slot defined by the friction band members and the mounting bar passes through the slot whereby the slot defines one path of rotation of the semispherically shaped frame member relative to the body member, and the annular groove defines a second path of relative rotation between the body member and the semispherically frame. A manual operating shaft extends from the semispherical socket member so that the socket member can be manipulated relative to the body member and its annular groove. An arm member formed integrally with the semispherical socket is coupled to the apparatus being positioned, in the disclosed embodiment, an air directionality intruder member is an air outlet.

DESCRIPTION OF THE DRAWINGS

The above and other objects, advantages and features of the invention will become more apparent when considered with the following specification and accompanying drawings wherein.

DETAILED DESCRIPTION OF THE INVENTION

The basic structural components of the present invention comprises two interlocking components. The socket frame component incorporates one or more friction bands which has a pair of pivot pins or knobs which ride in the annular groove portion of the grooved "ball" to obtain the desired feel to the joint. By carefully choosing materials for the "ball" and socket, the feel can be maintained over a fairly wide range of temperatures. The joint is assembled by simply sliding the two pins in the socket with the annular grooves in the body member and rotating the socket so the pins 32 are captured by the circular annular groove in the body member. The invention can be injected molded in plastic. The assembly of the joint does not require a snap action or deforming of a retention feature in the joint, and it avoids over stressing a portion of joint during assembly. The interference fit with the friction band controls the "feel" to the user. By matching the coefficient of thermal expansion of the two components, the grooved ball joint will maintain its feel over a wide range of temperature.

Figure 1:
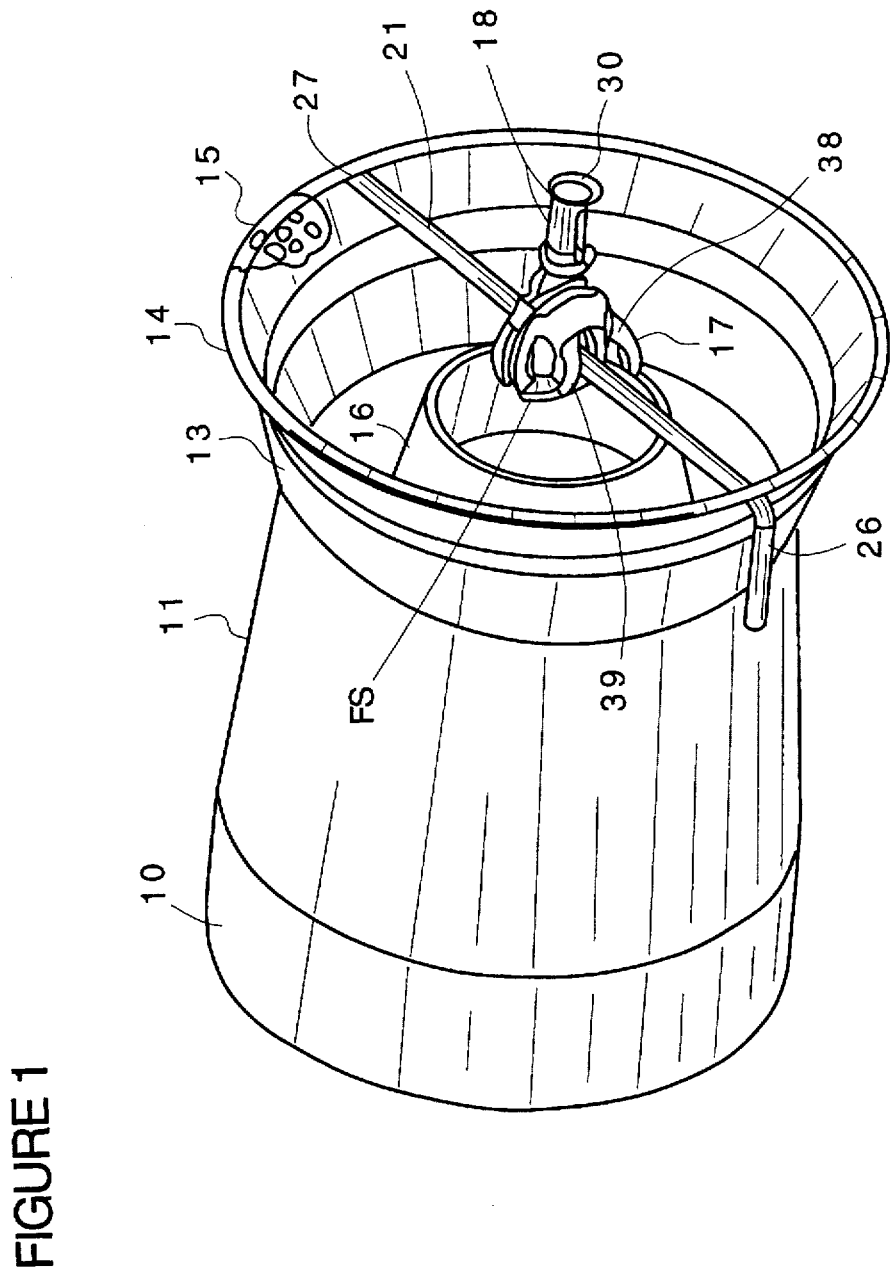
FIG. 1 is a partially cutaway isometric perspective view of a vehicular air outlet incorporating the invention.
Figure 2A:
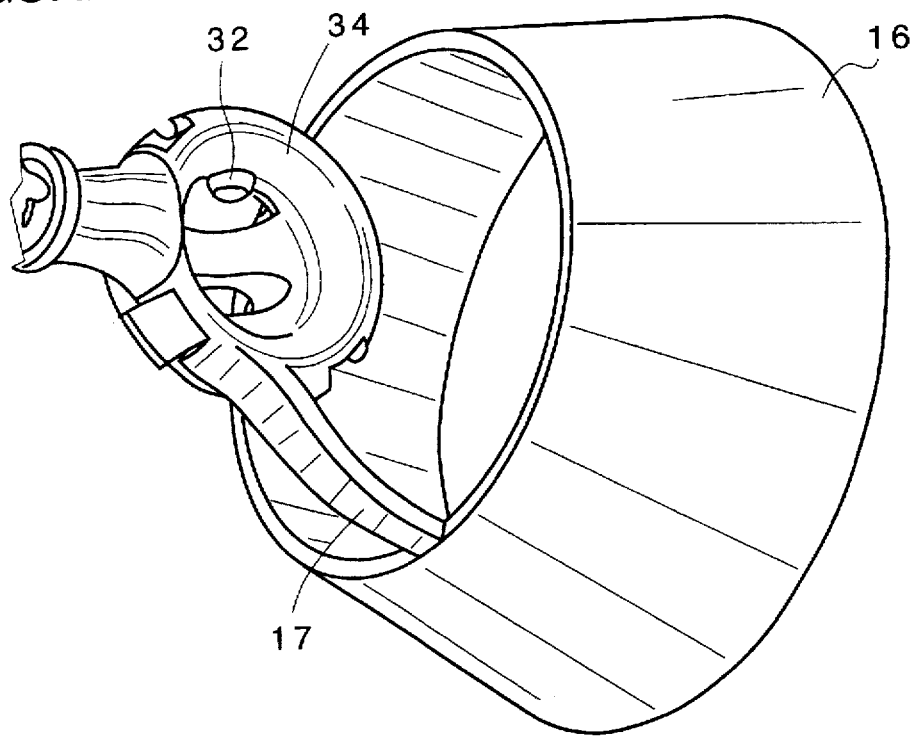
FIGS. 2A and 2B are perspective views from different angles of the socket member with an integrally formed intruder member and control knob.
Figure 2B:
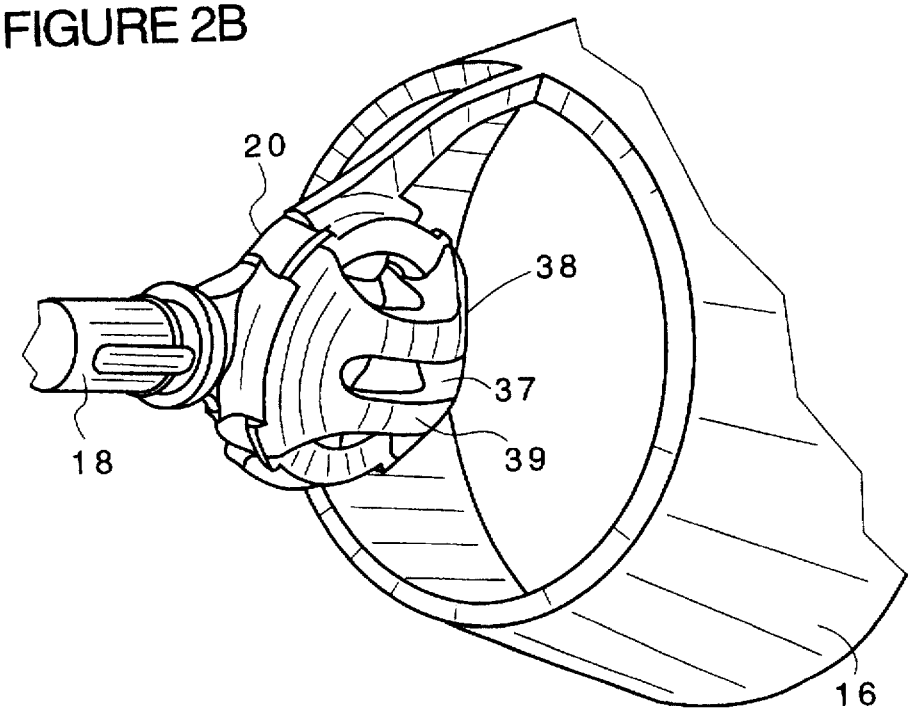

Referring now to FIG. 1, the invention is shown as it is applied in a vehicle air outlet to manipulate an upstream intruder member and control the directionality of air flow to ambient. As shown in FIG. 1, a circular input duct 10 converges to at 11 where it is connected to the upstream end 13 of the downstream diverging outlet bell 14 which, in this embodiment, is closed off by an outlet grille 15 preferably of the type disclosed in the above referenced Stouffer et al patents. However, other types of grilles can be used and in fact there can be applications where no outlet grille is required. Upstream intruder or deflection controller member 16 in this embodiment is a frustrum of a cone. A control shaft 18 is secured to intruder member 16 by an arm member 17.

Figure 3:
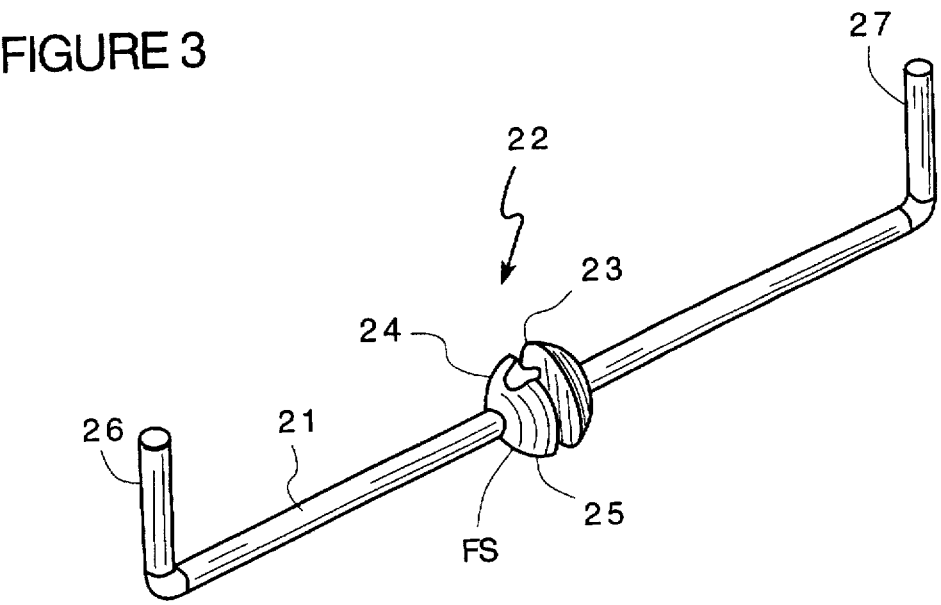
FIG. 3 is a perspective view of the mounting bar with the ball or body member fixedly formed or secured thereon.
Figure 4:
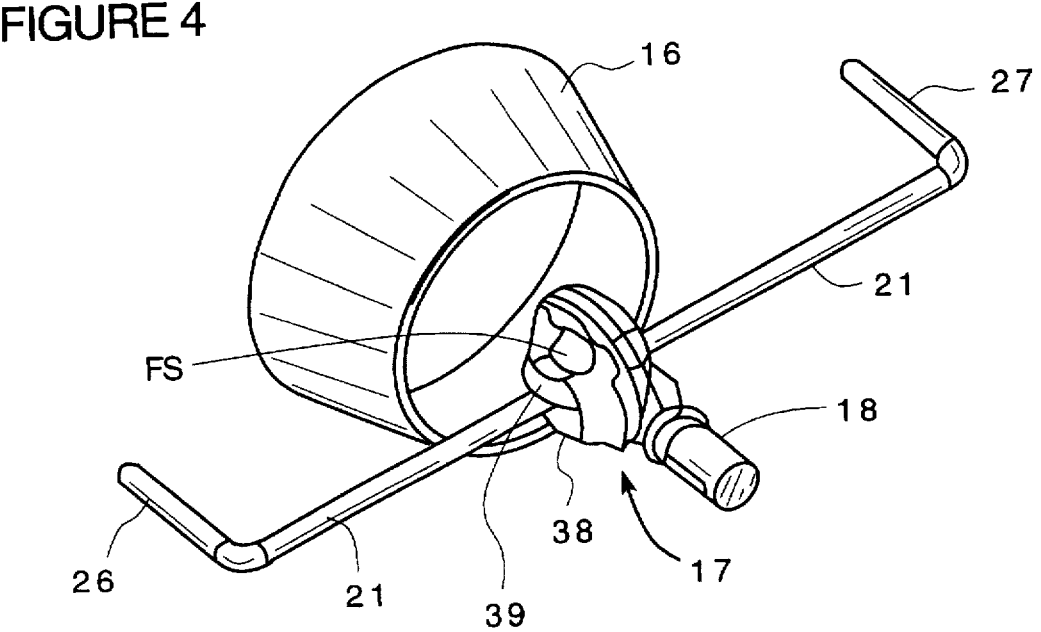
FIG. 4 is a perspective view showing the body member snapped into position in the socket member.

The present invention is concerned with the two degrees of movement mechanism or "ball" and socket coupling arrangement between the control shaft 18 and the mounting member 21. As shown in FIG. 3, the mounting bar 21 has molded thereon a "ball" or body member 22 which has an annular groove 23. Although the term "ball" member is used, it will be appreciated that this is a body member which has an annular groove 23, a friction surface FS and a pair of tangential notches 24, 25 which intersects circumferential or annular groove 23. In a preferred embodiment, the tangential notches 24, 25 are on diametrically opposite sides of the member 22. The lateral ends 26, 27 of mounting bar 21 are fixedly mounted in the end of outlet bell 14. An aperture (not shown) in grille 15 is provided to permit the shaft 18 to protrude outwardly to a control knob 30.

In the present embodiment, the directionality control intruder member 16 is molded integrally with the socket frame 17 which, in this embodiment, is a semispherically shaped frame member 20 having an arm 17 joining the intruder member 16. Control arm 18 is likewise integrally molded with the semispherical frame member 20. Semispherical frame member 20 has a pair of axially aligned knobs 32, 33 (which can be viewed as protuberances or pivot pins) on opposite sides diametrically opposing edges of entrance mouth 34, and an elongated slot 37 is formed in semispherical frame member 20 defined by friction bands 38 and 39.

To assemble the semispherical socket frame member 20 to "ball" member 22, one end of mounting bar 21 is passed through slot 37 and then the diametrically opposed knobs 32, 33 are aligned with notches 24, 25 respectively and pressed inside the semispherically shaped frame member until the knobs 32, 33 are aligned with annular groove 23.

Friction bands 38 and 39 engage friction surface FS (see FIG. 1) and assure a fairly uniform and continuous "feel" to operation.

The annular groove 23 thus defines one axis of rotation with the knob members engaged with an annular groove and the slot 37 defined the second path of angular rotation of the shaft relative to the semispherically shaped frame member with the knob members defining the axis of rotation therein. Thus, a joint is provided in which the body member and annular groove with tangential notches intersecting the annular groove at a diametrically opposed position defines one of the components for the joint and the semispherically shaped frame member having an open side with a pair of diametrically opposed knob members defining the second socket member for the "ball" and socket joint.

The socket incorporates a friction band, members 38 and 39, which ride on the ball shaped portion FS of the grooved ball to obtain the desired "feel" to the joint. By carefully choosing the material for the ball and socket, the "feel" can be maintained over a fairly wide range of temperatures. The joint is assembled by simply allowing the two knobs with the tangential notches in the socket with the annular groove in the ball and rotating the socket so that the knobs are full captured by the annular groove in the ball.

In a preferred embodiment, the two parts are injection molded and preferably with the air directionality control member joined to the semispherically shaped socket along with a control knob.

While a preferred embodiment of the invention has been illustrated and described, it will be appreciated that other embodiments, adaptations and modifications of the invention will be readily apparent to those skilled in the art.

What is claimed is:

1. A joint comprising:

a body member defining an annular groove and a pair of tangential notches intersecting said annular groove at diametrically opposed positions, a socket member comprised of a shaped frame having an open side and a pair of diametrically opposed knob members, each knob member being engagable with one of said tangential notches to snap fit said body member within said shaped frame and within said annular groove.

2. The joint defined in claim 1 including coacting friction means on said body and socket members to control resistance to movement.

3. The joint defined in claim 2 wherein said shaped frame is semispherically shaped.

4. The joint defined in claim 2 including a mounting bar and wherein said body member is secured to said mounting bar.

5. The universal joint defined in claim 3 wherein said semispherically shaped frame has an elongated slot and said mounting bar passes through said slot, whereby said slot defines one path of rotation of said semispherically shaped frame member relative to said body member and said annular groove defines a second path of relative rotation between said body member and said semispherically shaped frame.

* * * * *